United States Patent
Allen et al.

(10) Patent No.: US 11,328,087 B1
(45) Date of Patent: May 10, 2022

(54) MULTI-PARTY ANALYSIS OF STREAMING DATA WITH PRIVACY ASSURANCES

(71) Applicant: Amazon Technologies, Inc., Seattle, WA (US)

(72) Inventors: Nicholas Alexander Allen, Kirkland, WA (US); Xianrui Jeri Meng, Newcastle, WA (US)

(73) Assignee: Amazon Technologies, Inc., Seattle, WA (US)

(*) Notice: Subject to any disclaimer, the term of this patent is extended or adjusted under 35 U.S.C. 154(b) by 243 days.

(21) Appl. No.: 16/141,789

(22) Filed: Sep. 25, 2018

(51) Int. Cl.
| | |
|---|---|
| G06F 21/62 | (2013.01) |
| H04L 29/06 | (2006.01) |
| G06F 21/60 | (2013.01) |
| H04L 9/06 | (2006.01) |
| G06F 21/10 | (2013.01) |
| H03K 19/21 | (2006.01) |

(52) U.S. Cl.
CPC .......... *G06F 21/6245* (2013.01); *G06F 21/10* (2013.01); *G06F 21/602* (2013.01); *H04L 9/0643* (2013.01); *H04L 63/0428* (2013.01); *H03K 19/21* (2013.01)

(58) Field of Classification Search
None
See application file for complete search history.

(56) References Cited

U.S. PATENT DOCUMENTS

| 8,443,205 B2 * | 5/2013 | Kolesnikov | H04L 9/06 713/189 |
| 2003/0078923 A1 * | 4/2003 | Voss | G06F 16/284 |
| 2012/0233460 A1 * | 9/2012 | Kamara | H04L 9/3218 713/168 |
| 2015/0063563 A1 * | 3/2015 | Vaya | H04L 9/008 380/30 |
| 2016/0044003 A1 * | 2/2016 | Raykova | H04L 9/0861 713/150 |

(Continued)

FOREIGN PATENT DOCUMENTS

| WO | WO-2019121384 A1 * | 6/2019 | .............. H04L 9/00 |

OTHER PUBLICATIONS

Yao, "Protocols for Secure Computations," 1982 IEEE, 5 pages, Berkeley, California, U.S.A.

(Continued)

*Primary Examiner* — Fatoumata Traore
(74) *Attorney, Agent, or Firm* — Davis Wright Tremaine LLP

(57) ABSTRACT

Systems and methods for implementing a secure and efficient cryptographic protocol for analyzing data objects while providing assurances of data privacy and security. A data object may be obfuscated and provided for analysis (e.g., to a data analytics service) without necessarily providing access to the (e.g., plaintext) data object. For example, a first computing entity and second computing entity may agree upon a function or circuit that performs a certain type of computational task, such as comparing a first data set controlled by the first computing entity and a second data set controlled by the second computing entity. An event-driven function may be invoked by the event-driven compute service in response to detecting satisfaction of a condition as part of monitoring alerts that are generated as a result of the output of the computational task described above.

20 Claims, 9 Drawing Sheets

(56) References Cited

U.S. PATENT DOCUMENTS

| | | | |
|---|---|---|---|
| 2018/0019997 A1* | 1/2018 | Chabanne | H04L 63/0861 |
| 2018/0165460 A1* | 6/2018 | Tueno | H04L 9/06 |
| 2019/0044003 A1* | 2/2019 | Heck | G02B 6/4206 |
| 2020/0202038 A1* | 6/2020 | Zhang | G16H 50/30 |
| 2020/0242466 A1* | 7/2020 | Mohassel | G06F 21/6254 |

OTHER PUBLICATIONS

Kolesnikov et al., "Improved Garbled Circuit: Free XOR Gates and Applications," 12 pages, Murray Hill, New Jersey, U.S.A. and Bochum, Germany.

Yakoubov, "A Gentle Introduction to Yao's Garbled Circuits," 12 pages, Boston University, U.S.A.

Wikipedia, The Free Encyclopedia, "Don't-care term," last edited Apr. 28, 2018, 2 pages, <https://en.wikipedia.org/wiki/Don%27t-care_term> [retrieved Aug. 20, 2018].

Hohenberger, "Special Topics in Theoretical Cryptography," Mar. 19, 2007, 4 pages.

Orlandi, "The Simplest Oblivious Transfer Protocol," Jun. 15, 2015, <https://www.youtube.com/watch?v=pli-YTBBoIU> [retrieved Sep. 25, 2018] 1-page screenshot.

\* cited by examiner

MULTI-PARTY ANALYSIS OF STREAMING DATA WITH PRIVACY ASSURANCES

BACKGROUND

Analysis of stream data with privacy assurance presents several technical challenges. In some systems, there are real-time constraints with respect to how quickly the data is to be processed and in some cases, failure to process the data within a specified time period may be functionally equivalent to failing to process the data. Computer systems to analyze data streams may be configured to operate in a distributed computing environment that utilizes computing resources of a computing resource service provider.

In some cases, data stream analysis is performed using data that is controlled and/or owned by multiple computing entities. For example, a data analysis routine or function may operate using, as inputs, a first set of data controlled and accessible to a first computing entity and a second set of data controlled and accessible to a second computing entity. In various computing environments, preserving data privacy is desirable or even required. Therefore, it is desirable, in at least some computing environments, to perform multi-party analysis of streaming data with privacy assurances. There are various challenges involved in the implementation of such a protocol to be efficient and secure without compromising the privacy of data to another party even another party that is privileged to perform some or all of the data analysis operations.

BRIEF DESCRIPTION OF THE DRAWINGS

Various techniques will be described with reference to the drawings, in which.

DETAILED DESCRIPTION

Figure 1:
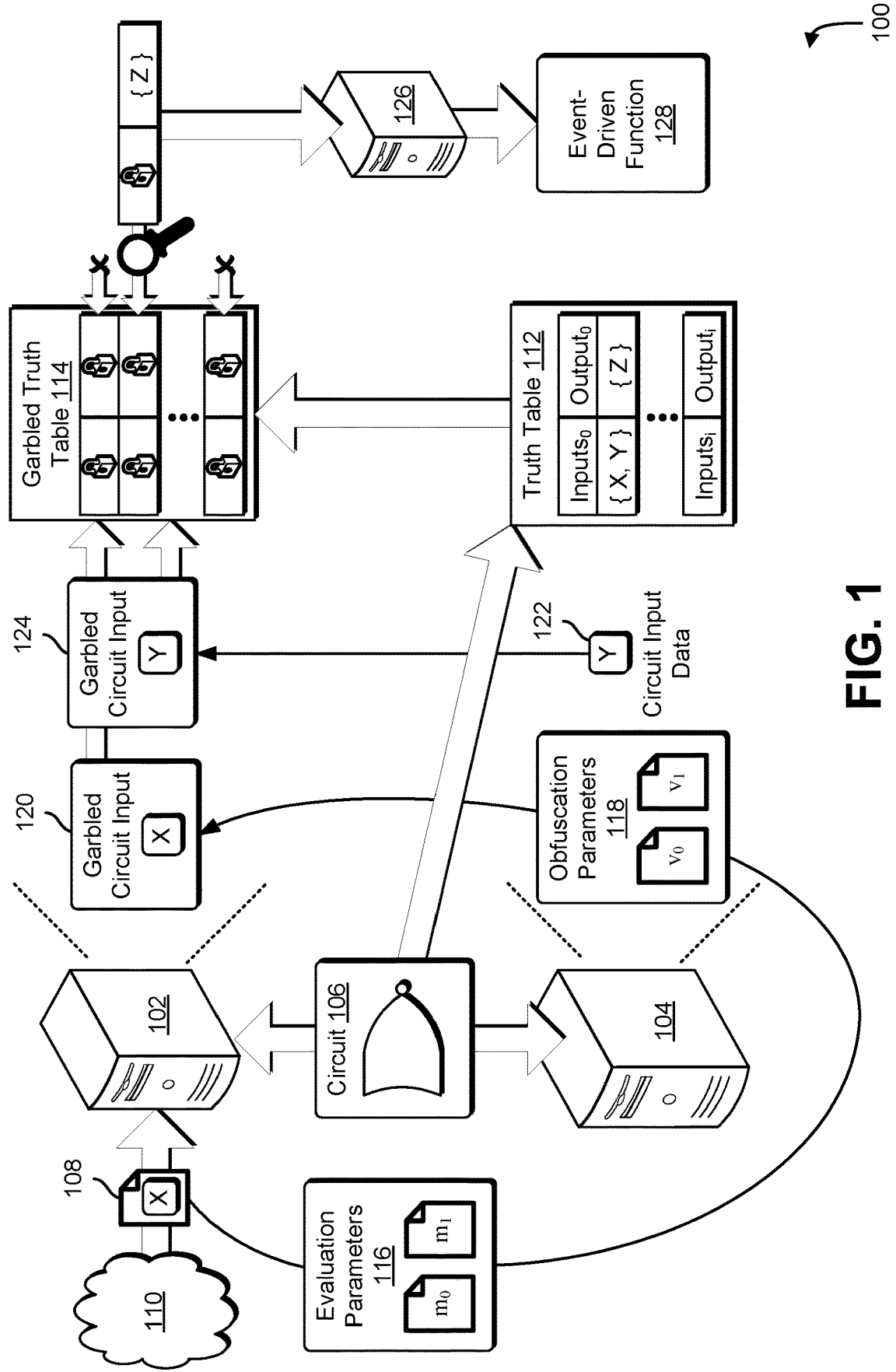
FIG. 1 illustrates a computing environment that provides real-time data processing and data analytics according to a cryptographic protocol that preserves the privacy of a data stream utilized to perform the real-time data processing and data analytics.

As described in greater detail herein below, systems and methods may be utilized to implement a secure and efficient cryptographic protocol for analyzing data objects while providing assurances of data privacy and security. In various embodiments, a data object is obfuscated and provided for analysis (e.g., to a data analytics service) to a computing entity without necessarily providing access to the (e.g., plaintext) data object. For example, a first computing entity and second computing entity may agree upon a function or circuit that performs a certain type of computational task, such as comparing a first data set controlled by the first computing entity and a second data set controlled by the second computing entity (e.g., set membership test, determining which data is larger, and more).

According to the protocol, the first data set cannot be revealed to the second computing entity in plaintext, and the second data set cannot be revealed to the first computing entity in plaintext. Restrictions on how data may be accessed by various computing entities are described in greater detail below, in accordance with at least one embodiment. As described in greater detail below, a computing entity such as a data analytics service may perform data analytics in conjunction with another computing entity such as a data security service that implements a garbler module. The data analytics service may be configured via software, hardware, or a combination thereof to evaluate and analyze data. The data analytics service, in some embodiments, implements an evaluation module to execute a multi-party computation in which the evaluation module receives a set of obfuscated inputs and an obfuscated function, wherein the set of obfuscated inputs are generated based on a set of inputs that, if evaluated against a function, generates the output. The evaluation module may generate the output using the obfuscated function and the set of obfuscated inputs, even if the evaluation module lacks access to the set of inputs. For example, the set of obfuscated inputs may be ciphertext of the set of inputs, wherein the evaluation key lacks access to cryptographic material such as a cryptographic key that can be used to decrypt said ciphertext.

A data analytics service and a data security service may coordinate to agree upon a circuit, or more generally, any suitable function that accepts input parameters and generates an output. The data security service may determine information that usable to determine outputs of a function based on inputs. A truth table for the circuit may be generated. The truth table may comprise a set of rows, wherein each row of the set of rows includes a set of inputs (e.g., inputs to a circuit) and a set of outputs that corresponds to the result(s) of evaluating the circuit from the set of inputs. In an embodiment, a garbled truth table is generated from the truth table by re-ordering the rows of the truth table (e.g., to a random order) and encrypting data of the truth table (e.g., outputs and inputs encrypted). More generally, the data security service may obtain a function and determine an obfuscated function which is provided to the data analytics service by the data security service. The data analytics service may also receive garbled or obfuscated inputs for the obfuscated function—for example, a first input may be obtained by the data security service, obfuscated to produce a first obfuscated input, and the first obfuscated input may be transmitted to the data analytics service. The data analytics service may provide a second input to the data security service as part of an oblivious transfer protocol and receive, from the data security service, a second obfuscated input. The first and second obfuscated inputs may be utilized in conjunction with an obfuscated function to determine an output note that the output corresponds to the output that would have been generated by the function using the un-obfuscated inputs. It should be noted that, in an embodiment, the data analytics service lacks access to one or more inputs (e.g., access to the first obfuscated input does not necessarily imply access to the first input) and the data security service may lack access to one or more inputs (e.g., the second input, is not exposed in plaintext to the data security service 304 as part of the oblivious transfer protocol).

An event-driven function (e.g., those illustrated in FIG. 4) may be invoked by the event-driven compute service in response to detecting satisfaction of a condition as part of monitoring the operation of cryptographic protocol that preserves the privacy of a data stream utilized to perform the real-time data processing and data analytics. In an embodiment, the event-driven compute service monitors alerts that are generated by a data analytics service that implements an evaluation module that determines the output of a circuit based on a garbled truth table. More generally, the events may be generated by any computing entity that participates in a multi-party computation such as a computing entity that implements a garbler module or an evaluation module. In some embodiments, the event-driven compute service detects satisfaction of the condition, retrieves an event-driven function, and provisioning a computing environment to run a routine that includes the custom logic. The provisioning process may include, for example, allocating compute resources of a compute resource service provider to run a virtual machine instance, provisioning the virtual machine instance with a computing environment suitable for running the event-driven function associated with an event that has been triggered, and executing the event-driven function using the virtual machine instance. After the event-driven function has been executed, the computing resources (e.g., the virtual machine instance) that were allocated in response to the triggered event may be de-provisioned (e.g., the virtual machine instance may be terminated) such that computing resources are made available for other uses, such as other requests in a distributed computing environment that may be unrelated to the event-driven function referenced above.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described herein are an improvement to the realm of electronic data security that is rooted in computer technology—for example, by keeping circuit input data obfuscated while still allowing a computing entity to execute an electronic circuit to determine an output based on the circuit input data and as a result of determining the output satisfies a trigger, cause an event-driven compute service to provision a set of computing resources to execute an event-driven function, wherein the event-driven function is selected from a plurality of event-driven functions based on the function. The techniques described herein are not abstract ideas which can be performed as a purely mental process or using pencil and paper. Furthermore, it is noted that the techniques described herein, such as causing, at a first computing entity: determining a truth table for a circuit, the truth table comprising a plurality of rows, a row of the plurality comprising a set of inputs that, if evaluated using the circuit, results in an output; and obfuscating the truth table to generate an obfuscated truth table by at least: obfuscating the set of inputs, thereby generating a set of obfuscated inputs; and re-ordering the rows of the garbled truth table; and causing, at a second computing entity: obtaining the obfuscated truth table; obtaining, from the first computing entity, a first obfuscated input of the set of obfuscated inputs, wherein the first obfuscated input is derived from a first input accessible to the first computing entity; obtaining, from the first computing entity, a second obfuscated input of the set of obfuscated inputs, wherein the second obfuscated input is derived from a second input accessible to the second computing entity; and determining, from the set of obfuscated inputs, the output; and as a result of determining the output satisfies a trigger, cause an event-driven compute service to provision a set of computing resources to execute an event-driven function, wherein the event-driven function is selected from a plurality of event-driven functions based on the function are not well-understood, routine, or conventional.

As one skilled in the art will appreciate in light of this disclosure, certain embodiments may be capable of achieving certain advantages, including some or all of the following: improvement to security of electronic data, enabling a computer system to evaluate a circuit to determine an output based on an input while lacking access to the input value, and more.

FIG. 1 illustrates a diagram of a computing environment 100 in which an embodiment in accordance with this disclosure can be implemented. In various embodiments, the computing environment includes a worker computer system and a first computing entity 102 and a second computing entity 104 that collectively perform a multi-party computation. A multi-party computation may refer to a cryptographic computing model that allows two or more separate entities to jointly compute a function over a set of inputs to generate an output. In various embodiments, the multi-party computation has privacy properties that constrain the exchange of information such that the first computing entity provides a first subset of inputs and the second computing entity provides a second subset of inputs such that, according to the protocol, one or more of the entities participating in the multi-party computation is able to determine an output generated by the function while simultaneously also lacking access to information usable to determine inputs from one or more of the other participating entities of the multi-party computation. In an embodiment, a multi-party computation is performed according to a cryptographic protocol by the first computing entity 102 and the second computing entity 104.

In an embodiment, the first computing entity 102 and second computing entity 104 collectively include executable code that, when executed, causes the computing entities to jointly perform a set of computer-executable instructions to implement a cryptographic protocol for exchanging cryptographically protected information that is used to evaluate a function and generate an output without revealing inputs to the function provided by the counterparty as an illustrative example, it may be the case that the first participant of a multi-party computation is unable to determine the inputs to the function that were provided by the second participant and vice versa (e.g., the second participant is unable to determine the inputs to the function that were provided by the first participant). Said another way, in some embodiments, a plurality of computing systems may collectively execute a function to determine an output based on a set of inputs provided by the plurality of computing systems, wherein a computer system of the plurality lacks information usable by the computer system to determine the value of inputs to the function provided by other computer systems of the plurality. The function, as described above, may refer to the circuit 106 illustrated in FIG. 1. In an embodiment, the multi-party computation referred to herein is in accordance with protocols described by Yao in "Protocols for Securing Computations" which is hereby incorporated by reference into this disclosure.

It should be noted that in the context of this discussion, the inability for a participant to determine information (e.g., inputs supplied by another participant) refers to there being no computationally feasible mechanism to determine such information—for example, the computational complexity for determining the information may be such that it would take an impractical amount of computational resources. For example, in the context of this disclosure, there may be various environments in which a computing entity receives a ciphertext of certain data and does not have access to cryptographic material (e.g., a cryptographic key) that is usable to decrypt the ciphertext such a computing entity may be said to lack access to or be unable to determine the aforementioned data even though the computing entity may, technically speaking, be able to determine the data by performing a brute force attack (although it should be noted that the expected run-time of a brute force attack may be impractically long). Such data may, throughout this disclosure, be referred to as data that is inaccessible to the computing entity.

In an embodiment, the first computing entity 102 is a participant of a multi-party computation that may also be referred to as a worker computer system, evaluation engine, participant of the multi-party computation. These terms may, based on context, be used interchangeably. The computing entity 102 may be implemented as software (e.g., executable code) running on one or more computer servers of a computing resource service provider. In an embodiment, the computing resource service provider includes a set of application programming interface (API) commands that implement "multi-party computation as a service" (MPCaaS). In an embodiment, the computing entity 102 utilizes various types of computing resources such as compute resources (e.g., virtual machine instances), data storage resources (e.g., hard disk drives), structured storage resources (e.g., relational database services), cryptographic resources (e.g., cryptographic key management services), directory resources (e.g., ActiveDirectory services), data processing applications (e.g., streaming processing services), and more these should be considered non-limiting examples of computing resources that may be utilized and are merely illustrative of the various types of resources that can be used to implement multi-party analysis of streaming data with privacy assurances. Some or all of the resources described herein may be provided as services of a computing resource service provider. For example, the first computing entity 102 may be a compute instance (e.g., a virtual machine instance) of a fleet of compute instances that are executed on computer servers provided by a compute service of a computing resource service provider on behalf of a streaming processing service of the computing resource service provider.

The first computing entity 102 may receive, obtain, or otherwise have access to a first set of data 108. The first set of data 108 may refer to data that is provided to the first computing entity 102 from another source, such as via a data source that provides the data as part of an ongoing data stream via a network 110. In an embodiment, the network 110 includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server for receiving requests and serving content in response thereto, although for other networks an alternative device serving a similar purpose could be used as would be apparent to one of ordinary skill in the art.

In an embodiment, the first set of data 108 comprises data that is used or otherwise usable as an input to evaluate a circuit. For example, first set of data 108 may be or may be part of a continuous data stream that is extracted, parsed, and reformatted to conform to the input format suitable for evaluating the circuit. In an embodiment, the first set of data 108 is extracted from a data stream, transformed from one format to another (e.g., decompressed), and reformatted (e.g., type-casted from one data type to another) to conform to the input format specified by a function, or any combination thereof. These are merely illustrative examples of different types of operations that can be performed on the first set of data 108 in an embodiment, and are not to be construed as limiting the scope or breadth of the types of operations that can be performed as part of a cryptographic protocol that preserves the privacy of a data stream utilized to perform data processing and data analytics.

In an embodiment, the first set of data 108 is provided, by computing resources of an organization, to the first computing entity which is a computing resource hosted by a computing resource service provider on behalf of the organization. In an embodiment, security permissions are associated with the first set of data 108. The security permissions as described herein may indicate how the first set of data 108 can or cannot be utilized. In an embodiment, a policy associated with the first set of data 108 (e.g., the policy encodes one or more permissions that define access rights to the first set of data) can be evaluated by an authorization module or authorization service to determine whether and/or in what manner the first set of data 108 can be utilized. For example, a policy associated with the first computing entity 102 may indicate that the first computing entity 102 is allowed to access the data in a plaintext and/or readable format. In an embodiment, a policy associated with the second computing entity 104 indicates that the second computing entity 104 is allowed to access the data in an obfuscated format and/or that the second computing entity 104 is allowed to utilize an obfuscated format of the first set of data as part of performing a multi-party computation. The policies and permissions described herein may be in accordance with those described elsewhere in this disclosure, such as in connection with FIG. 5, which is discussed in greater detail below. In an embodiment, the first set of data 108 is a set of binary inputs to the circuit 106. As an illustrative example, "X" and "Y" shown in FIG. 1 are inputs to the circuit 106 which, if evaluated, generates an output "Z" note, however, that access to the input values of "X" and "Y" may be restricted such that the value of "X" is accessible to the first computing entity 102 and is not accessible to the second computing entity 104. Similarly, the value of "Y" which serves as a different input to the circuit 106 may be known to the second computing entity 104 and should not be revealed to the first computing entity 102.

In an embodiment, the first set of data 108 is received by a computing resource service provider via a network communication and the first set of data 108 is stored using a suitable computing resource of the computing resource service provider, such as a database service, data storage service, etc. such that the data may be later retrieved by the first computing entity 102 as part of a cryptographic protocol that preserves the privacy of a data stream utilized to perform data processing and data analytics. The first set of data 108 may be first circuit input data 108 (e.g., denoted as the input parameter "X" illustrated in FIG. 1) having a value that corresponds to an input to the circuit 106 illustrated in FIG. 1.

The second computing entity 104, as illustrated in FIG. 1, is any suitable computing entity such as one or more hardware servers, one or more virtual machine instances, or a combination thereof. In an embodiment, the second computing entity 104 is implemented using computing resources of a computing resource service provider. In some cases, the second computing entity 104 executes a program that includes instructions that, if executed in connection with a program of the first computing entity 102, performs a multi-party computation in which the first computing entity 102 is unable to determine or otherwise learn of the inputs that are provided by the second computing entity 104 to the first computing entity 102 in a garbled format that the first computing entity 102 can use to perform a multi-party computation.

In an embodiment, the first computing entity 102 and the second computing entity 104 are controlled by different entities or organizations. For example, the first computing entity 102 may refer to software (e.g., a first software application) executed on computing resources of a computing resource service provider on behalf of a first organization and the second computing entity 104 may refer to software executed on computing resources of the same computing resource service provider on behalf of a second organization different from the first organization. In an embodiment, the programs can be executed on the same hardware servers of the computing resource service provider, such as in the case where different virtual machine instances of the same hardware server are running the programs.

The circuit 106 illustrated in FIG. 1 may refer to a Boolean circuit representation of a digital logic circuit. In an embodiment, the circuit comprises a set of logic gates such as: AND, OR, NAND, NOR, XOR, NOT, or a combination thereof. In an embodiment, not all logic gates are used, required, or even supported—for example, any Boolean circuit can be represented by singleton sets {NAND} and {NOR} (i.e., NAND is functionally complete and NOR is functionally complete). Further, {AND, NOT} is functionally complete but {AND} is not functionally complete. In an embodiment, the circuit is constructed solely from XOR and AND gates. In an embodiment, the number of AND gates are minimized, as the computational cost of performing XOR operations may be free or cost far less than performing AND gates. Techniques for enabling computation of XOR gates for free may be in accordance with those described by Kolesnikov and Schneider in "Improved garbled circuit: Free XOR gates and applications" which is hereby incorporated by reference. In an embodiment, the circuit further comprises a set of one or more input wires (e.g., each wire can have a binary value of one or zero) that serve as inputs to logic gates and evaluation of the logic gates generates one or more outputs of the circuit (e.g., one or more binary outputs). In some cases, a circuit can be evaluated even when one or more inputs are not supplied a binary input value—for example, in cases where an input is a "don't-care term" that does not affect the output of the circuit. In an embodiment, "don't care terms" may be referred to as unknown values in a multi-valued logic system and may be utilized to minimize logic circuit design through the use of Karnaugh maps and/or the Quine-McClusky algorithm.

The circuit 106 may be any suitable circuit, including but not limited to circuits that are used to determine set intersection between a first set of data accessible to one computing entity and a second set of data accessible to another computing entity wherein these entities (and perhaps more entities, in the case where n>2) do not wish to reveal the members of their respective sets of data to the other party in plaintext for various reasons which may include privacy, regulatory, legal and/or corporate compliance, contractual obligations, and more. For example, in an embodiment, the first computing entity 102 is operated on behalf of an aviation organization having flight manifest information (e.g., the set of passengers scheduled to fly on a particular flight) and the second computing entity 104 may be a regulatory organization having a list of restricted passengers. While there may be a need to determine whether any restricted passengers are included in the flight manifest (e.g., to perform additional security measures), one or more of the organizations may not want to share their data in plaintext with the other. It should be further more noted that techniques described herein do not require the use of a trusted third party.

In an embodiment, the circuit 106 is used to generate a truth table 112 that maps a set of inputs (i.e., the inputs of the circuit) to a set of outputs (i.e., the outputs of the circuit). In an embodiment, the first computing entity 102 and the second computing entity 104 first agree on the circuit 106 and then the second computing entity generates the truth table 112. The truth table 112 may be generated in any suitable manner, such as by determining the set of all possible input values to the circuit and for each set of input values, determining the corresponding outputs. The truth table 112 may be utilized to generate the garbled truth table 114, as illustrated in FIG. 1. The garbled truth table 114 may be described in greater detail below, such as in connection with FIGS. 2 and 3. In an embodiment, the truth table is arranged in a sequential order, such as show in the table below:

| Binary Value (Decimal Value) | a (first input wire) | b (second input wire) | c (third input wire) |
|---|---|---|---|
| 000 (0) | 0 | 0 | 0 |
| 001 (1) | 0 | 0 | 1 |
| 010 (2) | 0 | 1 | 0 |
| 011 (3) | 0 | 1 | 1 |
| 100 (4) | 1 | 0 | 0 |
| 101 (5) | 1 | 0 | 1 |
| 110 (6) | 1 | 1 | 0 |
| 111 (7) | 1 | 1 | 1 |

In an embodiment, the second computing entity 104 generates a truth table 112 that is represented by rows having inputs and corresponding outputs that are based on the input values and the configuration of the circuit 106. In an embodiment, each combination of input values is included in the truth table (i.e., if there are N binary inputs, there are 2N rows of the truth table). In an embodiment, the second computing entity 104 generates the garbled truth table 114 from the truth table 112 by encrypting each row of the truth table and re-ordering the truth table. In an embodiment, entire rows are encrypted (e.g., sequentially or in parallel). In an embodiment, the inputs of a row are encrypted to produce a ciphertext input, the output of the row is encrypted to produce a ciphertext output, and the ciphertext input and ciphertext output are concatenated to produce a ciphertext row of the truth table. The rows of the garbled truth table may be re-ordered such that the input values are not determinable based on their position in the garbled truth table 114. In an embodiment, a random or pseudo-random number generator is utilized to re-order the rows of the truth table to generate the garbled truth table. In an embodiment, a set of garbled inputs can be used to evaluate the circuit 106 to determine a garbled output, which corresponds to a particular row of the garbled truth table. In an embodiment, the first computing entity 102 is only able to determine the row of the garbled truth table that corresponds to the particular input values used to generate the garbled inputs—for example, if {X, Y} were input values to the circuit 106, the output generated by the circuit 106 would be {X}. However, note that the first computing entity does not directly have access to the value {Y} but rather has access to the a garbled version of {Y}. Accordingly, evaluating the circuit 106 with the garbled input does not, generally speaking, result in the output {Z}.

In an embodiment, an oblivious transfer protocol is a cryptographic primitive utilized by the first computing entity 102 and the second computing entity 104 that is secure against semi-honest adversaries. A semi-honest adversary may refer to the case where one of the participants of a multi-party computation follows the steps of the protocol but may alter the input values it provides (e.g., due to a software bug, malicious party injecting code/data). In an embodiment, the evaluation parameters 116 refer to a set of elements that is transmitted by the first computing entity 102 to the second computing entity 104 as part of an oblivious transfer protocol wherein at least one element of the set of elements corresponds to a value to be used to generate a garbled circuit input. In an embodiment, the oblivious transfer protocol is a 1-2 oblivious transfer protocol this is merely an illustrative example, other types of oblivious transfer protocols are also contemplated in connection with various embodiments, including but not limited to 1-out-of-n and k-out-of-n oblivious transfer protocols. In an embodiment, the first computing entity sends a first message $m_0$ that includes an input value derived from x and a second message $m_1$ that includes another value σ that may be a random group element generated using a random or pseudo-random process. In an embodiment, the first and second messages $m_0$ and $m_1$ are the evaluation parameters 116. Generally speaking, the input value can be transmitted as part of a message $m_n$ and values of $m_i$ for i≠n are randomly selected. In an embodiment, the messages include unique payloads (i.e., $m_a \neq m_b$ for a≠b).

In an embodiment, such as one in which the first and second computing entities utilize a 1-2 oblivious transfer protocol, the evaluation parameter comprises the first message m0 and a request for an input parameter value and the second message has a corresponding request for a different input parameter value. For example, in the example described above where the first message $m_0=g^x$ and the second message is a random value $m_1=σ$, a request for the input value of X is associated with $m_0$ and a request for the input value of another identifier or parameter (e.g., a randomly selected parameter W) is associated with $m_1$. Upon receiving the two requests and the two messages, the second computing entity 104 may lack sufficient information to determine whether the first computing entity is actually interested in parameter X or the parameter W. In an embodiment, the second computing entity is unable to determine whether W or X will be used to evaluate the circuit 106 as part of the multi-party computation. Conversely, if the example is altered so that $m_0=σ$ and $m_1=g^x$, the request for the actual circuit input X is associated with $m_1$.

The second computing entity 104 may receive the evaluation parameters 116, wherein the evaluation parameters comprise messages $m_0$ and $m_1$ and corresponding requests for data (e.g., request for data value of X which will actually be used in the computation and another value W which will be discarded). The second computing entity 104 may perform additional operations to generate obfuscation parameters 118. The same operations may be performed on $m_0$ and $m_1$. For example, the second computing entity 104 may choose $r \leftarrow \mathbb{Z}_q$ and compute $u=g^r$, $v_0=(m_0)^r \cdot x_0$, $v_1=(m_1)^r \cdot x_1$ and sends $u$, $v_0$, and $v_1$ as part of the obfuscation parameters 118 to the first computing entity 102. Accordingly, it can be generalized that, in some embodiments, the obfuscation parameters 118 are generated using the same formula for each of the messages included in the evaluation parameter wherein $v_i=(m_i)^r$ for each message $m_i$.

The second computing entity 104 may transmit the obfuscation parameters 118 to the first computing entity 102 in a plaintext format—in other words, the communication of the obfuscation parameters 118 may be transmitted without the use of a cryptographically protected communications protocol. That said, it may be appropriate, in some embodiments, to provide computationally verifiable assurances of the integrity, authenticity, and/or confidentiality of the communication of the obfuscation parameters 118 as they are transmitted from the second computing entity 104 to the first computing entity 102. For example, a digital signature may be used to provide assurances of the authenticity and integrity of the obfuscation parameters 118 which the first computing entity 102 can verify. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. The first computing entity 102 may determine a first garbled circuit input 120 from the obfuscation parameters 118.

In an embodiment, the second computing entity 104 has (or generally, has access to) second circuit input data 122 (e.g., denoted as the input parameter "Y" illustrated in FIG. 1) and the value of Y is not to be revealed to the first computing entity 102 in plaintext. The second computing entity 104 may obfuscate, map, or garble the value of Y and provide a second garbled circuit input 124 that has a value based on the value of Y Note that it may be the case that while the truth table 112 for the circuit 106 is known to both computing entities, that neither of the computing entities (or, in the general case with n>2 participants, none of the computing entities) has access to the plaintext values of X and Y so as to be able to determine how to evaluate the circuit directly (e.g., without use of the garbled truth table 114).

Upon receiving the first garbled circuit input (e.g., the garbled value based on the value of variable X) and the second garbled circuit input (e.g., the garbled value based on the value of variable Y), the first computing entity 102 is able to identify a row of the garbled truth table 114 that corresponds to the garbled inputs and, furthermore, is able to use the first and second garbled circuit input to determine the result of the circuit evaluated using the circuit input data without revealing the values of the circuit inputs in other words, the first computing entity 102 is able to determine the result of evaluating the circuit 106 without necessarily having access to all inputs to the circuit (e.g., the first computing entity 102 lacks information sufficient to determine the value of the second circuit input data 122). In an embodiment, the rows of the garbled truth table 114 are encrypted and each row of the garbled truth table (or a portion thereof, such as only the output for the respective row) is decryptable based at least in part on having access to the respective garbled circuit inputs corresponding to the row.

As a result of evaluating a garbled circuit (e.g., by evaluating a garbled truth table 114 using a set of garbled circuit inputs to determine an output) the first computing entity 102 may generate an alarm, alert, notification, message, or any other suitable trigger mechanism to an event-driven compute service 126. The event-driven compute service 126 may be any suitable computing entity, such as an on-demand compute service of a computing resource service provider that provisions, loads, and executes code based on a trigger. The event-driven compute service 126 may be implemented according to the disclosures presented in FIG. 4 below. For example, an alert may be sent based on the circuit determining set membership in common between the first circuit input data 108 (e.g., a first set of members) and the second circuit input data 122 (e.g., a second set of members).

An alert may be generated using any suitable trigger mechanism, such as a message queue telemetry transport (MQTT). In an embodiment, the alert encodes the output value (e.g., the value of Z illustrated in FIG. 1) whereas in some cases the alert lacks such data. In an embodiment, the event-driven compute service 126 receives the alert and selects an event-driven function 128 from a set of event-driven functions to execute. The selection may be made based at least in part on determining an identifier associated with the alert and a corresponding event-driven function for that alert. The table may include a reference to an event-driven function. Upon selecting an event-driven function, the system may perform one or more of the following steps as a result of (e.g., in response to) receiving the alert: allocate compute resources, such as a virtual machine instance, using computing resources of a computing resource service provider, provision the compute resources according to a configuration specified as being appropriate for executing the event-driven function (e.g., by instantiating or provisioning additional resources that may be needed to execute the event-driven function), loading executable code to the compute resource corresponding to the event-driven function, and executing the event-driven function on said compute resources. In an embodiment, data from the circuit execution may be provided to the event-driven function 128 and execution of the event-driven function may be dependent upon the output data determined from evaluation of the garbled circuit.

Figure 2:
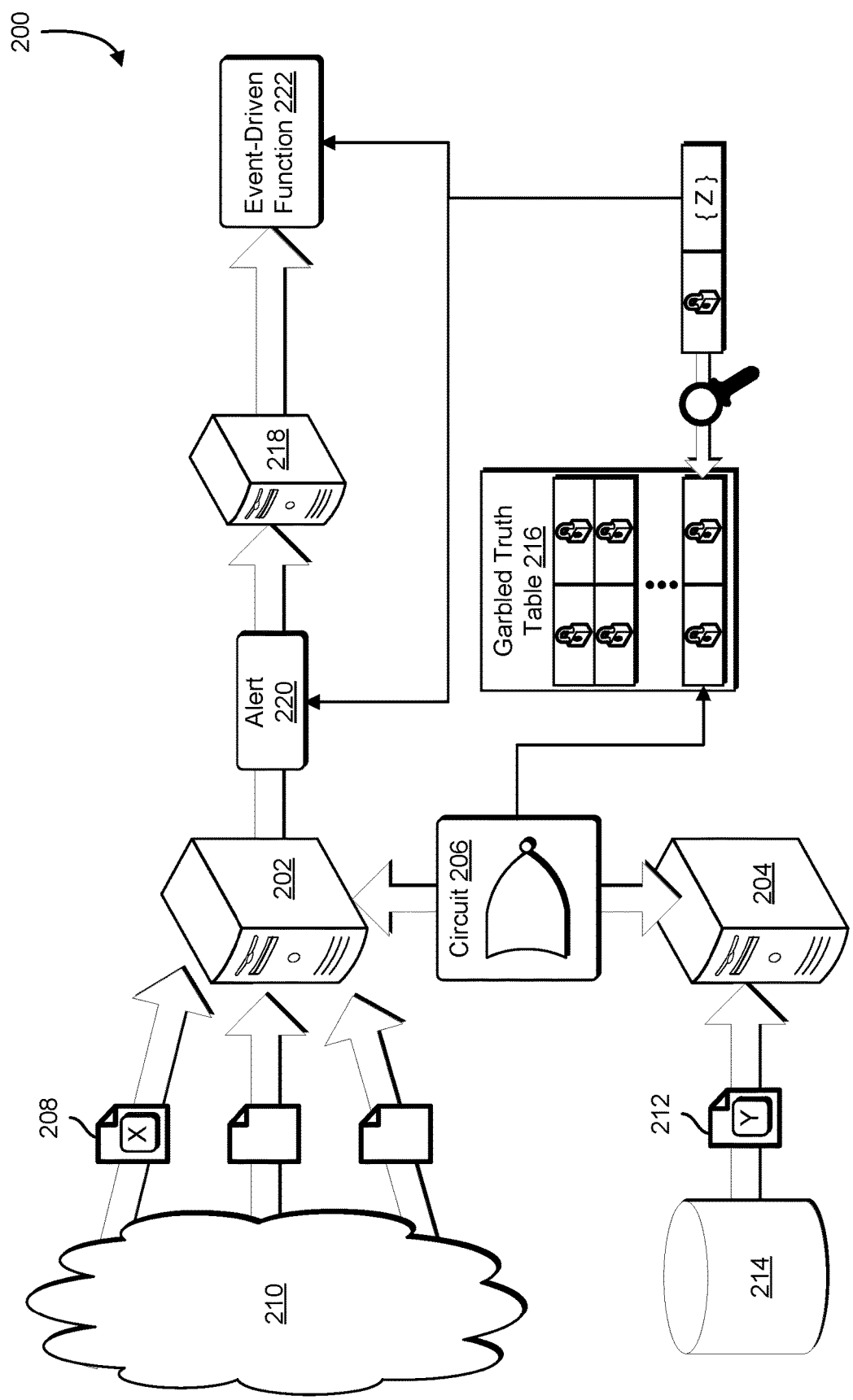
FIG. 2 illustrates a computing environment in which a multi-party computation is used to trigger an alert that results in the execution of an event-driven function, according to at least one embodiment.

FIG. 2 illustrates a computing environment 200 in which an alert is triggered based at least in part on a multi-party computation, resulting in the execution of an event-driven function, in accordance with at least one embodiment. The computing environment 200 may be implemented using any suitable computer system. In an embodiment, the system includes a first data service 202 and a second data service 204 that is implemented using any suitable computing system. In an embodiment, these services are in separate trust boundaries such that, according to a security model, certain data should not be shared between them. The first data service 202 and the second data service 204 may, as part of a protocol, agree upon a circuit 206. The services may agree upon the circuit as a preliminary step of the protocol, although the protocol can also be agreed upon at a later point in time (e.g., upon one or both parties obtaining the circuit input data that is to be used to evaluate the circuit 206). The circuit 206 may comprise a set of circuit inputs, a set of connected Boolean or logical gates, and one or more circuit outputs.

The first data service 202 may be a service provided by a computing resource service provider and may include web application programming interface (API) commands that can be to submit data as part of an ongoing data stream session. The data session may be submitted over a communications session (e.g., a transport layer security (TLS) session) over a network 210. The data may originate from an external source, such as the computer servers of an organization which transmit the data to the computing resource service provider hosting the first data service 202. The first data service 202 may be a data analytics service that exposes a set of web API commands or requests which can be used to perform multi-party computation with cryptographically verifiable assurances of confidentiality with respect to other multi-party computation participants such as the second data service 204. A first circuit input data 208 may be transmitted over the network 210 as part of the data stream.

It should be noted that while two data services are illustrated in FIG. 2, there may be more than two participants in the multi-party computation in some embodiments. For example, a third data service may contribute additional data that the data analytics service uses to evaluate the circuit 206. The third service may contribute garbled circuit input data in any suitable manner, which may utilize techniques described in connection with how the second data service 204 coordinates evaluation of the circuit 206 with the first data service 202.

The second data service 204 may be a computing system that has access to a second circuit input data 212 via a data store 214 as illustrated in FIG. 2. The data store 214 may be any suitable electronic data storage system such as a data server, a hard disk drive, cold storage, hot storage, or any other suitable electronic storage medium. The data store may have (or otherwise have access to) the second circuit input data 212. The data may be accessing to the second data service 204 based at least in part on completing an authentication process. In an embodiment, the first data service 202 is an evaluation module and the second data service 204 is a garbler module.

In an embodiment, the second data service 204 implements a garbler module that generates a garbled circuit. A garbled circuit can be represented by a garbled truth table 216. The garbled truth table 216 can be generated from the circuit 206 by: generating a truth table for the circuit 206, the truth table including a corresponding output for each valid set of inputs; encrypting each output, and permuting the encrypted outputs. In an embodiment, the system permutes the encrypted output by randomizing the order rows in the table accordingly, the location or ordinal of a row in the garbled truth table does not provide any information that can be used to determine the corresponding set of inputs. Encrypting the output is a form of obfuscation, and any suitable form of garbling may be utilized in place of or in addition to encryption. For example, a one-way cryptographic hash function may be utilized in a garbling process. In an embodiment, a garbled output is calculated by hashing a value based on the set of inputs, using the hash output to determine a cryptographic key (e.g., the hash output is the cryptographic key) and encrypting the output using the determined cryptographic key.

The circuit 206 may be a representation of any suitable electronic circuit, such as a circuit comprising set of binary input wires (e.g., representing ON/OFF states) connected to one or more Boolean gates (e.g., XOR and AND gates) that result in values being generated for one or more output wires. For example, the output wires may represent a binary value (e.g., a result indicating whether a circuit input supplied by one participant has a greater value than the circuit input supplied by the other participant). In an embodiment, an oblivious transfer protocol is utilized so that the second data service 204 provides a garbled version of the first circuit input data 208 to the first data service 202, thereby allowing computation of the circuit. In an embodiment, the second data service 204 generates the garbled truth table 216 and provides it to the first data service 202. The first data service 202 may receive the garbled truth table 216 and garbled inputs for each input of the circuit 206 and evaluate a garbled circuit using the garbled inputs, thereby determining a garbled output. The garbled circuit inputs may be used to compute a cryptographic key that can be used to de-obfuscate or decrypt the garbled output, thereby generating the output in FIG. 2, an example is shown in which inputs X and Y (having such values) evaluates to Z according to the circuit 206. Having the garbled inputs for X and Y, in an embodiment, can be used to determine the value of the output Z. In an embodiment, other outputs of the garbled truth table cannot be deduced.

In an embodiment, the first data service 202 implements an evaluation module. The evaluation module may be implemented as hardware, software, or a combination thereof. The evaluation module may include executable instructions that, as a result of execution by one or more processors of a computer system (e.g., the first data service 202), cause the computer system to obtain a set of garbled circuit inputs and evaluate a garbled circuit using said inputs. In an embodiment, the system receives a garbled truth table 216 from another computer system (e.g., a garbler module implemented by the second data service 204) and uses the garbled inputs in conjunction with the garbled truth table to determine an output. The output may correspond to the same output that would have been obtained from evaluating the circuit 206 using the inputs. In an embodiment, the garbled inputs are used to generate a cryptographic key and the cryptographic key can be used to decrypt an encrypted version of the output. In an embodiment, the cryptographic key is a symmetric cryptographic key. In an embodiment, the cryptographic key is derived by at least hashing the garbled inputs (e.g., concatenating and then hashing the garbled inputs).

In an embodiment, the first data service 202 determines the output (and, in some cases, also one or more of the inputs, such as inputs that were previously only available in garbled form) and generates an alert 220 based at least in part on the value of the output. For example, the alert 220 may be sent as a result of determining based on the output that there is a member in common between a first set of data (e.g., numeral 208) and a second set of data (e.g., 212) using the circuit 206 (e.g., a circuit that performs a set membership test). In some cases, the member in common is the output. In some cases, a Boolean value indicates whether there is a member in common. While an alert is illustrated in FIG. 2, any suitable trigger mechanism may be utilized. Non-limiting examples of trigger mechanisms include: alarm, alert, notification, message, and more.

In an embodiment, the alert 220 is transmitted by the first data service 202 to an event-driven compute service 218. These may be different services that are hosted by computing resources of a computing resource service provider. The event-driven compute service may be implemented in accordance with those described elsewhere in this disclosure, such as those discussed in connection with FIG. 4 in greater detail below. The alert 220, in an embodiment, includes an identifier associated with an event identifier that the event-driven compute service can use to identify a particular event-driven function from a plurality of event-driven functions. In some cases, the first data service 202 registers an event-driven function 222 and provides instructions to the event-driven compute service to execute the event-driven compute service 218 in response to receiving the alert 220. In an embodiment, the event-driven compute service stores a mapping between alert identifiers and event-driven functions (e.g., using any suitable data structure) so that when a particular alert is received, the corresponding event-driven function can be identified and executed.

Figure 3:
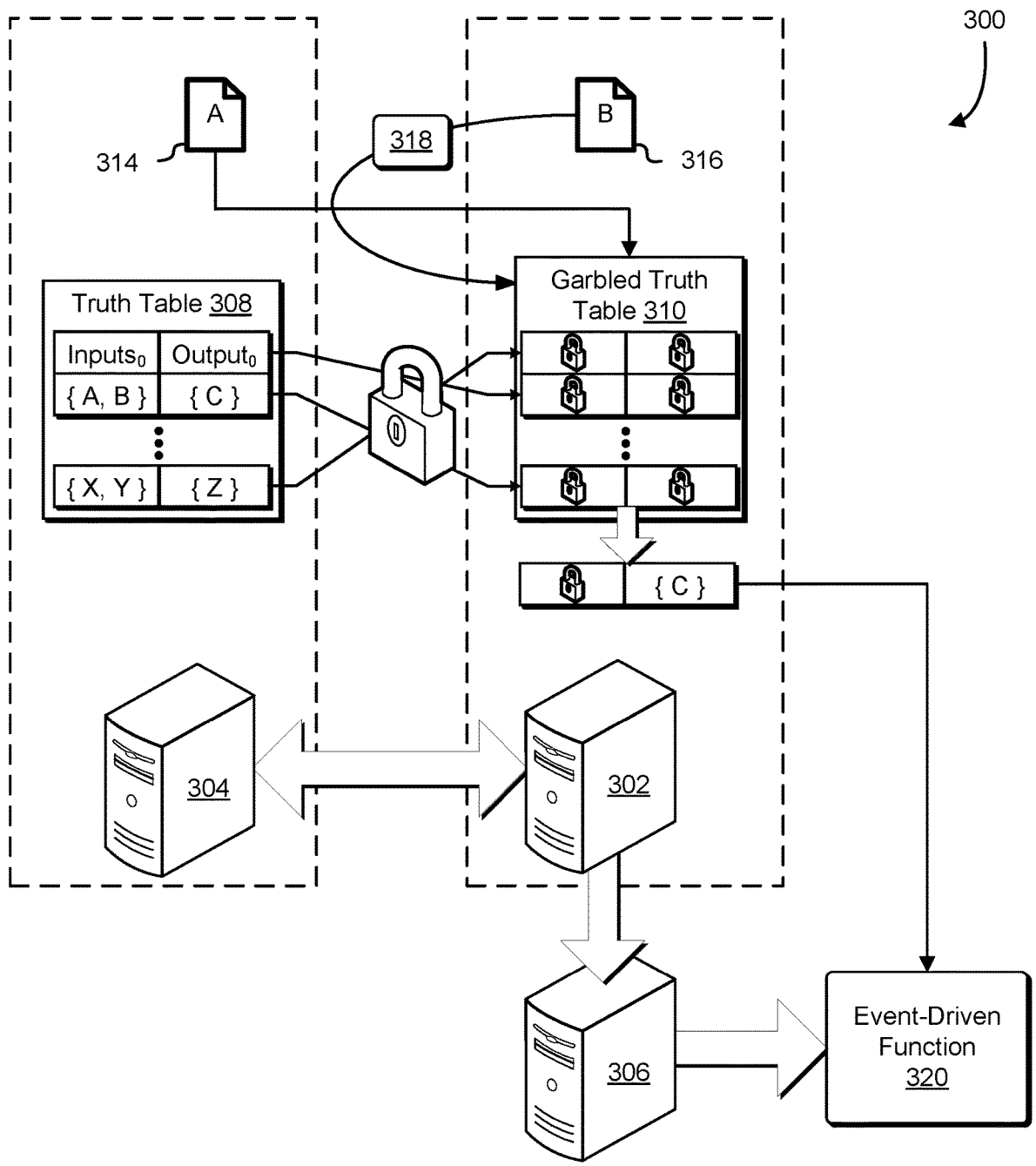
FIG. 3 illustrates a computing environment in which various embodiments can be implemented to trigger the execution of an event-driven function in response to the result of a multi-party computation, according to at least one embodiment.

FIG. 3 illustrates a computing environment 300 in which various embodiments can be implemented to trigger the execution of an event-driven function in response to the result of a multi-party computation. The computing environment 300 may be implemented at least in part by computing resources of a computing resource service provider, examples of which include implementation at least in part using a data analytics service 302, a data security service 304, and an event-driven compute service 306.

As illustrated in FIG. 3, a computing entity such as a data analytics service 302 may perform data analytics in conjunction with another computing entity such as a data security service 304 that implements a garbler module. The data analytics service 302 may be configured via software, hardware, or a combination thereof to evaluate and analyze data. The data analytics service 302, in some embodiments, implements an evaluation module to execute a multi-party computation in which the evaluation module receives a set of obfuscated inputs and an obfuscated function, wherein the set of obfuscated inputs are generated based on a set of inputs that, if evaluated against a function, generates the output. The evaluation module may generate the output using the obfuscated function and the set of obfuscated inputs, even if the evaluation module lacks access to the set of inputs. For example, the set of obfuscated inputs may be ciphertext of the set of inputs, wherein the evaluation key lacks access to cryptographic material such as a cryptographic key that can be used to decrypt said ciphertext. The dotted box surrounding the data analytics service 302 represents, in an embodiment, data that the data analytics service 302 has access to.

FIG. 3 further illustrates, in an embodiment, a data security service 304. The data security service 304 may refer to a service that has (or, generally, has access to) secure data. In an embodiment, secure data refers to data that is secured so that some computing entities lack access to the secured data. In some cases, lacking access to the secure data may mean that a computing entity has access to an obfuscated data generated based on the secure data and furthermore lacks access to information usable to determine the obfuscated data from the secure data in an embodiment, a one-way function is used to generate the obfuscated data from the secure data. The data security service 304 may, generally speaking, be any suitable computing entity that has access to data that is to be garbled and provided to the data analytics service 302 illustrated in FIG. 3. The dotted box surrounding the data security service 304 represents, in an embodiment, data that the data security service 304 has access to.

The event-driven compute service 306 illustrated in FIG. 3 is, in an embodiment, a service of a computing resource service provider that is configured to allocate and provision compute resources in response to an event such as an alarm and execute an event-driven function. Executable code may be loaded to the provisioned compute resources and execution of said executable code may result in the execution of an event-driven function 320. The event-driven compute service 306 may be in accordance with those described in connection with FIG. 4.

In an embodiment, the data analytics service 302 and the data security service 304 agree upon a circuit (or, more generally, a function having inputs and at least one output) for example, the data security service 304 may create, obtain, or otherwise determine a function or circuit submit it to the data analytics service 302 and request a confirmation from the data analytics service 302 that the circuit is acceptable for use in a multi-party computation.

The data security service may determine information that usable to determine outputs of a function based on inputs. In an embodiment, the function is a circuit, and the information is a truth table 308. The truth table may comprise a set of rows, wherein each row of the set of rows includes a set of inputs (e.g., inputs to a circuit) and a set of outputs that corresponds to the result(s) of evaluating the circuit from the set of inputs. In an embodiment, the garbled truth table 310 is generated from the truth table 308 by re-ordering the rows of the truth table 308 (e.g., to a random order) and encrypting data of the truth table (e.g., outputs and inputs encrypted). More generally, the data security service 304 may obtain a function and determine an obfuscated function which is provided to the data analytics service 302 by the data security service 304. The data analytics service 302 may also receive garbled or obfuscated inputs for the obfuscated function—for example, a first input 314 may be obtained by the data security service 304, obfuscated to produce a first obfuscated input, and the first obfuscated input may be transmitted to the data analytics service 302. The data analytics service 302 may provide a second input 316 to the data security service 304 as part of an oblivious transfer protocol 318 and receive, from the data security service 304, a second obfuscated input. The first and second obfuscated inputs may be utilized in conjunction with an obfuscated function to determine an output—note that the output corresponds to the output that would have been generated by the function using the un-obfuscated inputs. It should be noted that, in an embodiment, the data analytics service lacks access to one or more inputs (e.g., access to the first obfuscated input does not necessarily imply access to the first input) and the data security service may lack access to one or more inputs (e.g., the second input 316, is not exposed in plaintext to the data security service 304 as part of the oblivious transfer protocol 318).

Figure 4:
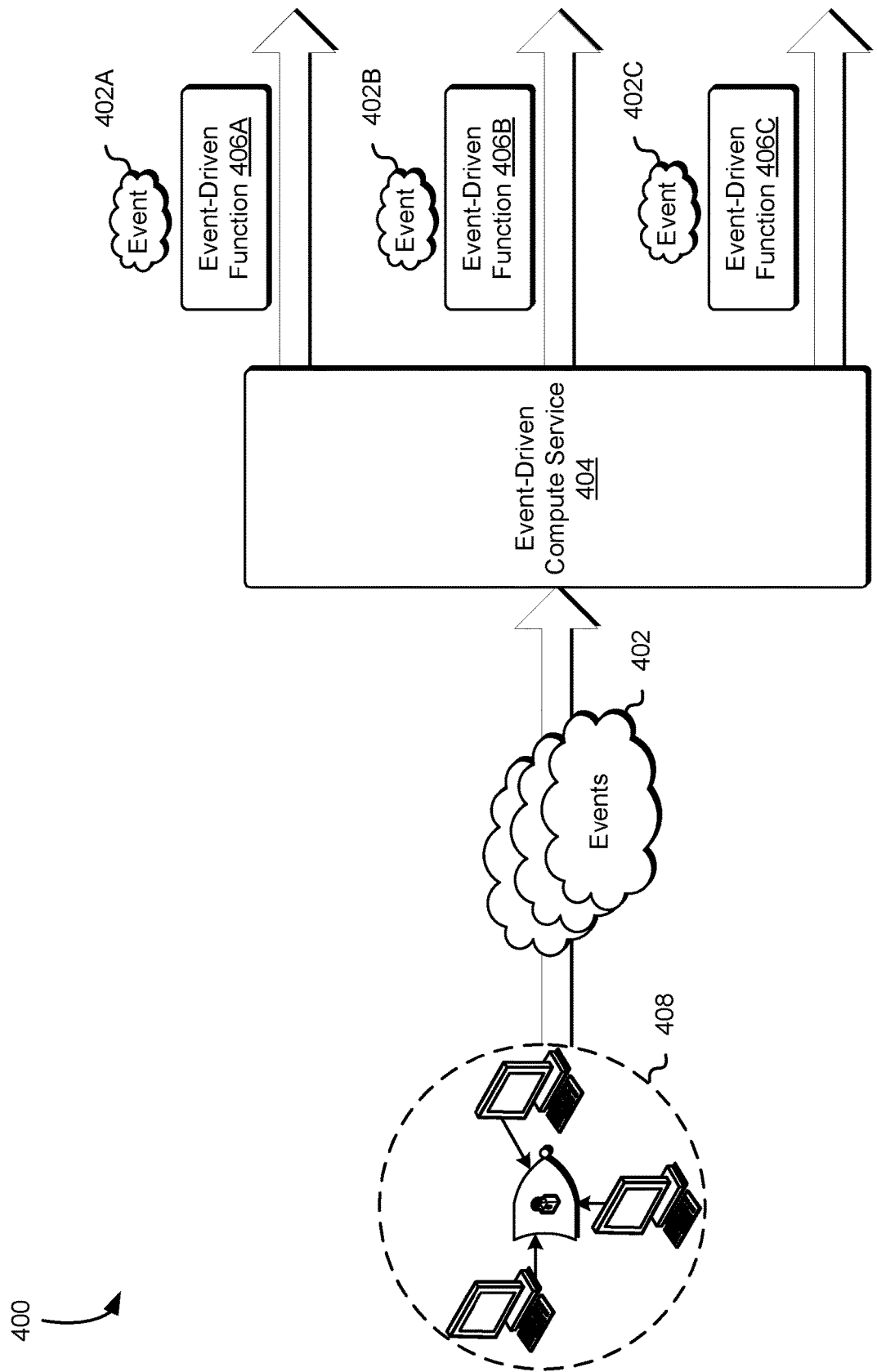
FIG. 4 illustrates a computing environment in which an event-driven compute service may be utilized to invoke various custom logics, according to at least one embodiment.

FIG. 4 illustrates an environment in which various embodiments can be implemented. The computing environment 400 illustrates an example where an event-driven compute service 404 may be utilized to invoke various custom logics. An event-driven compute service 404 may receive and/or monitor events 402 in the manner described above. In some embodiments, the events that the event-driven compute service 404 monitors include the outputs generated by a data analytics service that performs multi-party computations. An event-driven compute service 404 may receive an alert, notification, or other type of trigger mechanism that indicates a garbled circuit was evaluated using according to a multi-party computation and determine, based on one or more output values generated by the multi-party computation (and, in some cases, also based on the type of circuit evaluated) whether to invoke various types of business logic.

An event-driven function (e.g., those illustrated in FIG. 4) may be invoked by the event-driven compute service 404 in response to detecting satisfaction of a condition as part of monitoring the operation of cryptographic protocol that preserves the privacy of a data stream utilized to perform the real-time data processing and data analytics. In an embodiment, the event-driven compute service 404 monitors alerts that are generated by a data analytics service that implements an evaluation module that determines the output of a circuit based on a garbled truth table. More generally, the events 402 may be generated by any computing entity that participates in a multi-party computation 408 such as a computing entity that implements a garbler module or an evaluation module. In some embodiments, the event-driven compute service 404 detects satisfaction of the condition, retrieves a custom logic to run (e.g., an event-driven function) and provisioning a computing environment to run a routine that includes the custom logic. The provisioning process may include, for example, allocating compute resources of a compute resource service provider to run a virtual machine instance, provisioning the virtual machine instance with a computing environment suitable for running the custom logic or routine associated with an event that has been triggered, and executing the custom logic or routine using the virtual machine instance. After the custom logic or routine has been executed, the computing resources (e.g., the virtual machine instance) that were allocated in response to the triggered event may be de-provisioned (e.g., the virtual machine instance may be terminated) such that computing resources are made available for other uses, such as other requests in a distributed computing environment that may be unrelated to the custom logic or routine referenced above.

As a second example architecture, the event-driven compute service 404 may detect satisfaction of a condition, create a new process or thread, and execute the event-driven function on the created process or thread. The process or thread may, upon determining the result of executing the compliance routine, provide the compliance result to the event-driven compute service using various inter-process communication (IPC) techniques, such as the use of remote procedure call (RPC) interfaces. After providing the result, the process or thread may be terminated, releasing computing resources.

The event-driven compute service 404, which may be implemented in accordance with those described above in connection with FIG. 3, may be further configured to receive events from multiple data analytics services performing several multi-party computations. Accordingly, the event-driven compute service 404 may be used to aggregate the invocation of event-driven functions across data analytics being performed on multiple data streams. The event-driven compute service 404 may receive the events 402 and determine, either internally (e.g., using a component of the event-driven compute service) or externally (e.g., by delegating to another service) how to splice the events which may operate on different logics and/or different tables. As an example, the event-driven compute service 404 may include a mapping of custom logics to content providers or multimedia input streams. In an embodiment, an event-driven compute service is a service provided by a computing resource service provider and is implemented as software code executed on a fleet of hardware servers controlled by, operated by, or otherwise utilized on behalf of a computing resource service provider. The event-driven compute service may be accessible to a client computer system (e.g., some or all of the computing entities participating in a multi-party computation, such as the computing entities corresponding to numeral 408 illustrated in FIG. 4). In an embodiment, the event-driven compute service 404 is accessible to a client computer system via an endpoint that supports a series of web application programming interface (API) requests. The requests may include a request that allows the client computer system to upload custom logics; a request to identify an event or condition that can be used to trigger the execution of a custom logic; and more. In an embodiment, some or all of the web API requests allow the client computer system to specify a set of computing resources (e.g., a configuration for the type of virtual machine instance) to provision as a result of detecting satisfaction of a condition. The condition can be defined based on the result of executing a multi-party computation—for example, the condition, in an embodiment, refers to the result of a multi-party computation having a specified value, exceeding a threshold value, etc.

Custom logic 406A, 406B, and 406C may include executable code, routines, function pointers, input parameters to a routine, callback functions, API requests, or any combination thereof. As an example, the event-driven compute service 404 may include a mapping of compliance engines to events that indicate which routines should be invoked. Invoking a routine may include executing code or providing executable code as part of a request. FIG. 4 shows multiple events 402 that are received by the event-driven compute service 404 and spliced such that custom logic is run based on the type of error that caused the segment to have degraded quality. The custom logic 406A that is run in response to a first event 402A may be different from the custom logic 406B that is run in response to a second event 402B but need not be the case—the custom logic may, in some cases, be the same either literally (e.g., both events utilize a function pointer that runs the same executable code from memory) or logically (e.g., the same functional outcome). In some cases, the custom logic may use information included in the events 402A, 402B, and 402C to perform a workflow.

Figure 5:
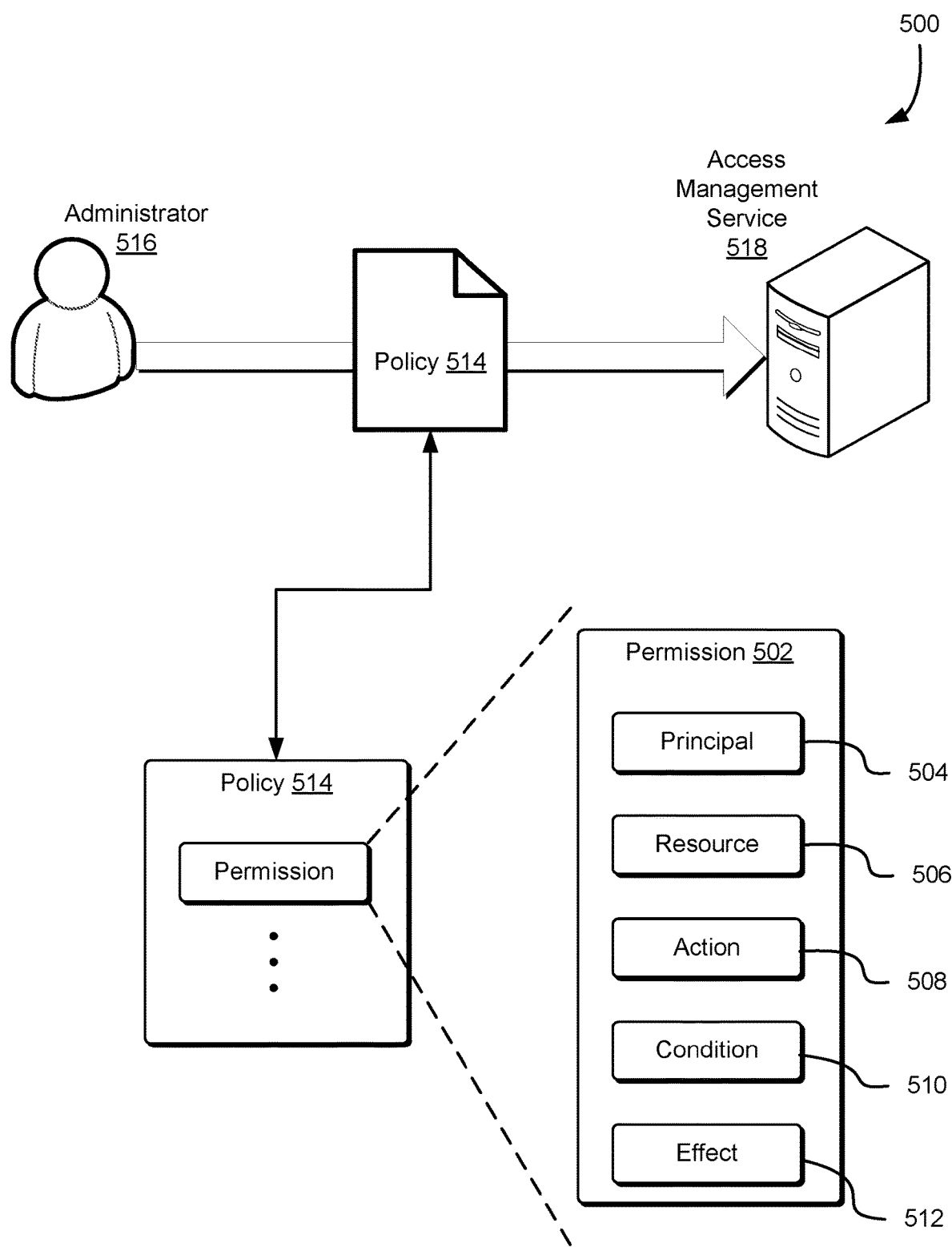
FIG. 5 illustrates security policies and permissions in accordance with various embodiments.

FIG. 5 illustrates a diagram of a computing environment 500 in which an embodiment in accordance with this disclosure is implemented. In an embodiment, an administrator 516 provides policy 514 comprising a set of security permissions (also referred to as permission) to an access management service 518 as part of a request. In an embodiment, the computing environment 500 illustrated in FIG. 5 is implemented in accordance with systems and techniques described in connection with FIGS. 1-4. A policy, in an embodiment, is associated with one or more principals and is usable (e.g., by an authorization service) to evaluate whether a request associated with a particular user or group should be fulfilled. In an embodiment, a permission 502 specifies a principal 504, a resource 506, an action 508, a condition 510, and an effect 512. In some embodiments, a permission 502 may also specify a plurality of one or more of these elements such as, for example, a set or class of users, a collection of resources, several different actions, and/or multiple conditions. In some embodiments, the permission 502 may specify one or more wildcard or otherwise modifiable characters that may be used to denote that the permission 502 may be modified to make the permission 502 applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal 504 may be a user, a group, an organization, a role, or a collection and/or combination of these or other such entities. A principal 504 may be any entity that is capable of submitting API calls that cause an action associated with a resource to be performed and/or any entity to which permissions associated with a resource may be granted. As an example, a permission 502 may have a principal 504 element specified in the following manner:

"Principal": "rn:ws:iam::ducksfan8"

In some embodiments, the principal 504 is identified by a resource name that uniquely identifies the principal 504. A principal 504 may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "ducksfan8")—in some formats and/or for some resources, a region namespace may be option; and "ducksfan8" may refer to an identifier for the account, such as the account that owns the resource 506 specified in the permission 502.

The resource 506 may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources 506 may be organized in a hierarchy, and may use structures such as folders, directories, buckets, etc. to organize sets of computing resources into groupings. In some cases, policies and/or permissions may be applied directly to a bucket and grant cross-account access to an environment. As an example, a permission 502 may have a resource 506 element specified in the following manner:

"Resource": "rn:ws:storage:::bucket/FlightManifest.dat"

In some embodiments, the resource 506 is identified by a resource name that uniquely identifies the resource 506. In some cases, the resource 506 may share a same naming convention as the principal 504 or other elements of the permission. However, this need not be the case, as each separate element of a permission 502 may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate a data file (e.g., flight manifest data) is stored in a bucket. In an embodiment, the resource 506 is a data file that includes circuit input data in accordance with those described in connection with FIGS. 1-4. For example, the passengers and crew data of the flight manifest may be cross-referenced against a restricted passengers list of a government organization by using a multi-party computation to perform a set membership test, wherein neither of the respective parties gains access to the others' data unless there is a set overlap (e.g., as indicated by a Boolean output of the set membership test).

The action 508 may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission 502 may have an action 508 element specified in the following manner:

"Action": "dataAnalytics:MPC_SetMembership"

In this example, the action that is allowed or denied (determined based on the effect 512 specified in the permission) corresponds to a data analytics service that supports an action (e.g., API call) for MPC_SetMembership, which may be used in connection with performing a multi-party computation that performs a set membership test. As discussed elsewhere, various namespaces may be used in connection with specifying an action. Wildcards may be used to specify multiple actions. For example, an action element described as "Action": "dataAnalytics:*" may refer to all APIs supported by a data analytics service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition 510 element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action 508 element. As an example, a permission 502 may have a condition 510 element specified in the following manner:

"Condition": {"DateLessThan": {"ws:CurrentTime": "1999-12-13" } }

In this example, the condition, the "ws:CurrentTime" value of the request is compared against a literal value "1999-12-13" using the condition operator "DateLessThan" which may be used to evaluate whether the condition is met. In this example, the condition may be true when the current time (e.g., the time the request is received by the service provider) is less than the supplied date of Dec. 13, 1999. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys.

An effect 512 may refer to whether the permission 502 is used to grant or deny access to the computing resources specified in the permission 502 in the resource 506 element. An effect 512 may be an ALLOW effect, which grants access to a resource, and a DENY effect, which denies access to a resource. In some embodiments the effect 512 may specify a limited grant of access, such as a grant of access that allows multi-party computation (e.g., a "MPC_ALLOW" effect). In an embodiment, the MPC_ALLOW effect allows particular data to be provided to a principal in an obfuscated format but not in a plaintext format. In some embodiments, access to computing resources of a computing resource service provider are denied by default and a permission affirmatively including an ALLOW effect is required. In an embodiment, a policy that includes an affirmative "DENY" for a computing resource supersedes any other permissions that would otherwise ostensibly grant access to the computing resource (e.g., if a container of an object has a corresponding policy with an "ALLOW" effect that is inherited by objects of the container and the object has a "DENY" effect, access to the object would be denied). As an example, a permission 502 may have an effect 512 element specified in the following manner:

"Effect": "MPC_ALLOW"

Accordingly, a permission statement that allows a particular principal (e.g., "rn:ws:iam::ducksfan8") to perform a multi-party computation by calling a data analytics service API (e.g., "dataAnalytics:MPC_SetMembership") and obtain a particular flight manifest (e.g., "rn:ws:storage:::bucket/FlightManifest.dat") when a specific condition is true (e.g., the API request is made prior to Dec. 13, 1999) may be specified in the following manner:

"Statement": [
{
"Effect": "MPC_ALLOW",

```
"Principal": "rn:ws:iam::ducksfan8",
"Action": "dataAnalytics:MPC_SetMembership",
"Resource":   "rn:ws:storage:::bucket/FlightManifest-
   .dat",
"Condition": {
   "DateLessThan": {
      "ws:CurrentTime": "1999-12-13"
   }
}
}
]
```

It should be noted that the examples described above merely described one of many ways in which permissions may be expressed. Of course, in other embodiments, variations on the principles described above in connection with FIG. 5 may be applied in various ways.

Figure 6:
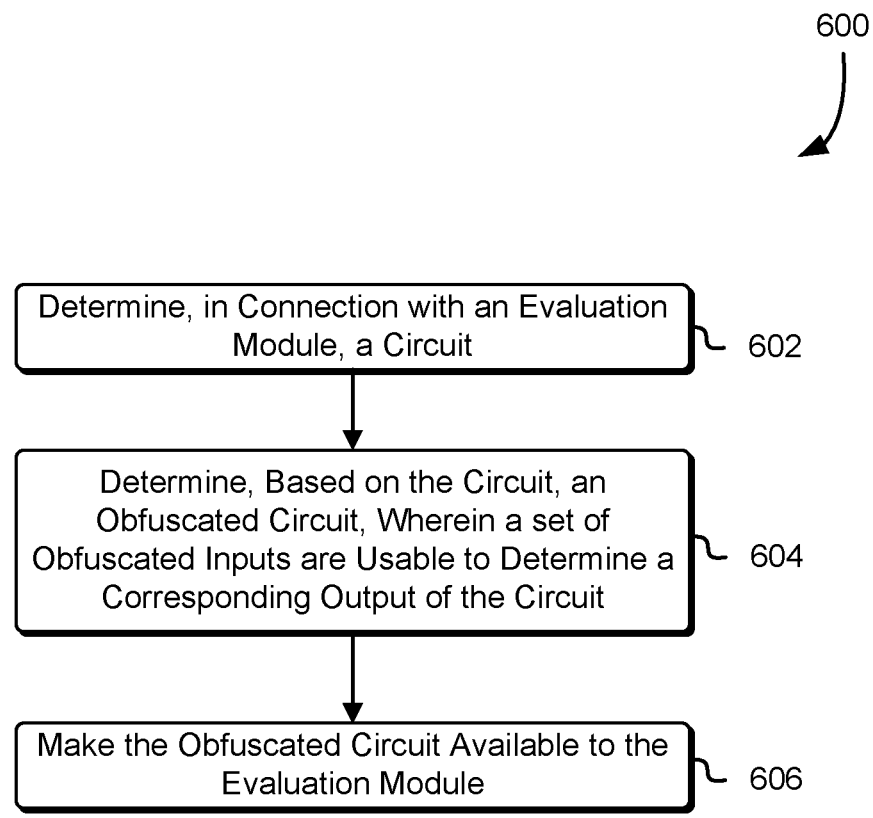
FIG. 6 shows an illustrative example of a process for performing at least part of a multi-party computation according to a cryptographic protocol that preserves the privacy of a data stream utilized to perform data processing and data analytics, in accordance with an embodiment.

FIG. 6 shows an illustrative example of a process 600 for performing at least part of a multi-party computation according to a cryptographic protocol that preserves the privacy of a data stream utilized to perform data processing and data analytics, in accordance with an embodiment. Some or all of the process 600 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 600 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 600 may be implemented at least in part by a garbler module such as those described in connection with FIGS. 1-3. The process may be implemented in connection with the process described in FIG. 7, according to a cryptographic protocol that preserves the privacy of a data stream utilized to perform data processing and data analytics, in accordance with an embodiment.

The system, in an embodiment, determines 602, in connection with an evaluation module, a circuit. The circuit may be determined by a user selecting a particular program or function to perform via a user interface. In an embodiment, the system receives a web API command indicating a program to run and constructs a circuit to perform the indicated program. For example, the request may include a parameter for an enumerated data type that indicates various types of programs and circuits supported by the system. The evaluation module may be implemented by any suitable computer system such as those described in connection with FIGS. 1-4. In an embodiment, computing entities that implement a garbler module and an evaluation module mutually agree upon the circuit using any suitable protocol—for example, the first computing entity may generate the circuit and submit it to the second computing entity and request a confirmation from the second computing entity that the circuit is acceptable for use in the multi-party computation. While a circuit is described in the context of the process 600 that is used as part of performing a cryptographic protocol for secure streaming check, the techniques described herein may be applicable to any suitable function, routine, program, circuit, computation task, etc., in which two or more computing entities perform a computation to generate an output based on a set of inputs wherein the inputs of a computing entity are not to be revealed or made available to other computing entities participating in the multi-party computation.

In an embodiment, the system determines 604, based on the circuit, an obfuscated circuit, wherein a set of obfuscated inputs are usable to determine a corresponding output of the circuit. The system may determine the obfuscated circuit based on techniques described elsewhere, such as in connection with FIGS. 1-4. The circuit may have various properties, such as a property that a set of inputs, if evaluated, results in an output. The set of inputs may be obfuscated to determine a set of obfuscated inputs and an obfuscated output, which may be included in a row of an obfuscated truth table. The set of obfuscated inputs and the obfuscated circuit may be usable to determine the corresponding output thereby allowing the computing entity to determine the expected output of having evaluated a circuit using a particular set of inputs, but without necessarily exposing the set of inputs to the computing entity.

After determining the obfuscated circuit, the system may make 606 the obfuscated circuit available to an evaluation module (e.g., another computing entity) in any suitable manner. For example, the system may generate a truth table, obfuscate the truth table by re-ordering the rows of the truth table and encrypting each row of the truth table using a cryptographic key derived from the inputs of the corresponding row of the truth table, and provide the obfuscated truth table to the other computing entity by transmitting the obfuscated truth table encoded in one or more data packets via a network such as the Internet. In an embodiment, the system stores the obfuscated truth table at a network location and provides the network location so as to allow the recipient of the network location to access the obfuscated truth table (e.g., a message transmitted to the recipient may include a software token that grants access to the data indicated by the network location). The obfuscated truth table may be stored using any suitable storage system, such as a data storage service of a computing resource service provider. In an embodiment, the system defines a garbled circuit by a set of wires to a set of gates that results in a set of outputs that has a truth table that corresponds to the obfuscated truth table as described above, and the system also provides the garbled circuit to the other computing entity. Combinations thereof are also contemplated within the scope of this disclosure.

Figure 7:
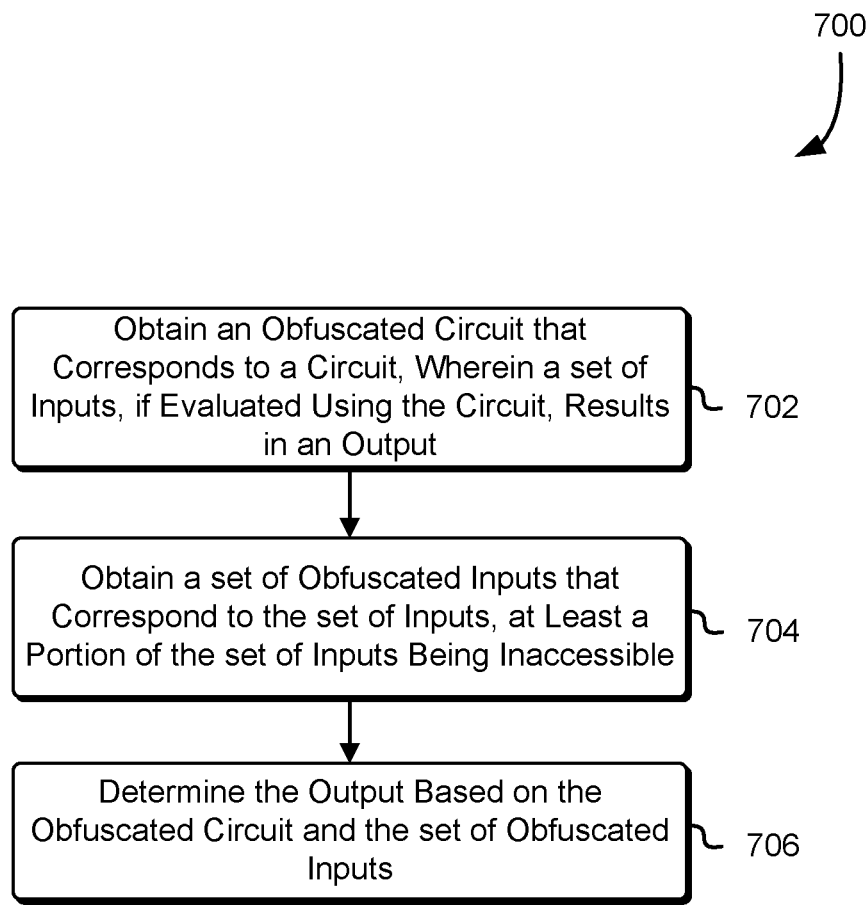
FIG. 7 shows an illustrative example of a process for performing at least part of a multi-party computation according to a cryptographic protocol that preserves the privacy of a data stream utilized to perform data processing and data analytics, in accordance with an embodiment.

FIG. 7 shows an illustrative example of a process 700 for performing at least part of a multi-party computation according to a cryptographic protocol that preserves the privacy of a data stream utilized to perform data processing and data analytics, in accordance with an embodiment. The process 700 may be implemented at least in part by an evaluation module such as those described in connection with FIGS. 1-3. As an example, the process 700 may be performed by a data analytics service implemented on one or more computer servers of a computing resource service provider that are loaded with computer-executable instructions that, if executed by one or more processors, cause the one or more processors to perform the process. In some embodiments, a non-transitory computer-readable medium encodes instructions that, as a result of execution by one or more processors of a computer system, cause the computer system to perform the process. The process may be implemented in connection with the process described in FIG. 7, according to a cryptographic protocol that preserves the privacy of a data stream utilized to perform data processing and data analytics, in accordance with an embodiment.

The computer system implementing the process may obtain 702 an obfuscated circuit that corresponds to a circuit, wherein a set of inputs, if evaluated using the circuit, result in an output. In an embodiment, the obfuscated circuit is received via one or more data packets via a network such as the Internet. The obfuscated circuit may be generated and provided to the system according to techniques described elsewhere in this disclosure, such as processes discussed in connection with FIG. 6. An obfuscated circuit may comprise a set of connected logical gates and a set of inputs (e.g., input wires to the logical gates). In various embodiments, input wires to the logical gates generate output values, which may, in turn, be inputs to other logical gates—evaluation of the circuit resulting in one or more outputs. In an embodiment, evaluation of a circuit (e.g., an obfuscated circuit) results in a binary value—for example, if a function or circuit implements a set membership test, the output may be a binary value that corresponds to whether there is an intersection between a first data set and a second data set (e.g., a first input that is supplied by a first computing entity and a second input that is supplied by a second computing entity, wherein the computing entities do not have access to the data sets of their respective counterparties). In some embodiments, the obfuscated circuit is provided and the system is able to generate a truth table for the obfuscated circuit. In an embodiment, a computer system generates a truth table from a circuit, generates an obfuscated truth table, and provides the obfuscated truth table to the system performing the process 700. An obfuscated circuit may, in some embodiments, refer to an obfuscated truth table. In some embodiment, the set of inputs refer to values for input parameters or input wires that are used as inputs to logical gates of a circuit. The logical gates may, in turn, generate an output to the logical gate that may be the input to another logical gate, and so on. The output of the circuit may be the output generated from the evaluation of one or more logical gates.

In an embodiment, the system obtains 704 a set of obfuscated inputs that correspond to the set of inputs, wherein at least a portion of the set of inputs being inaccessible to the system. Techniques described in connection with FIGS. 1-4 may be used to obtain the set of obfuscated inputs. For example, an input of the set of inputs may be owned by (e.g., access to the input is controlled by) another computing entity of a multi-party computation. The inputs may be obfuscated according to an oblivious transfer protocol. In some embodiments, the system has access to a particular input (or, more generally, one or more inputs) of the set of inputs and obtains a corresponding obfuscated input from another computer system according to an oblivious transfer protocol.

The system may determine 706 the output based on the obfuscated circuit and the set of obfuscated inputs, such as by utilizing techniques described in connection with FIGS. 1-4. In an embodiment, the set of obfuscated inputs are usable to determine cryptographic material that can decrypt an obfuscated output to determine the output (e.g., plaintext output). However, it should be noted in some cases that it is not necessarily the case that decryption is utilized, and in some cases, the obfuscated inputs are utilized in to compute the output without relying upon the use of cryptographic material to decrypt a ciphertext of the output.

Figure 8:
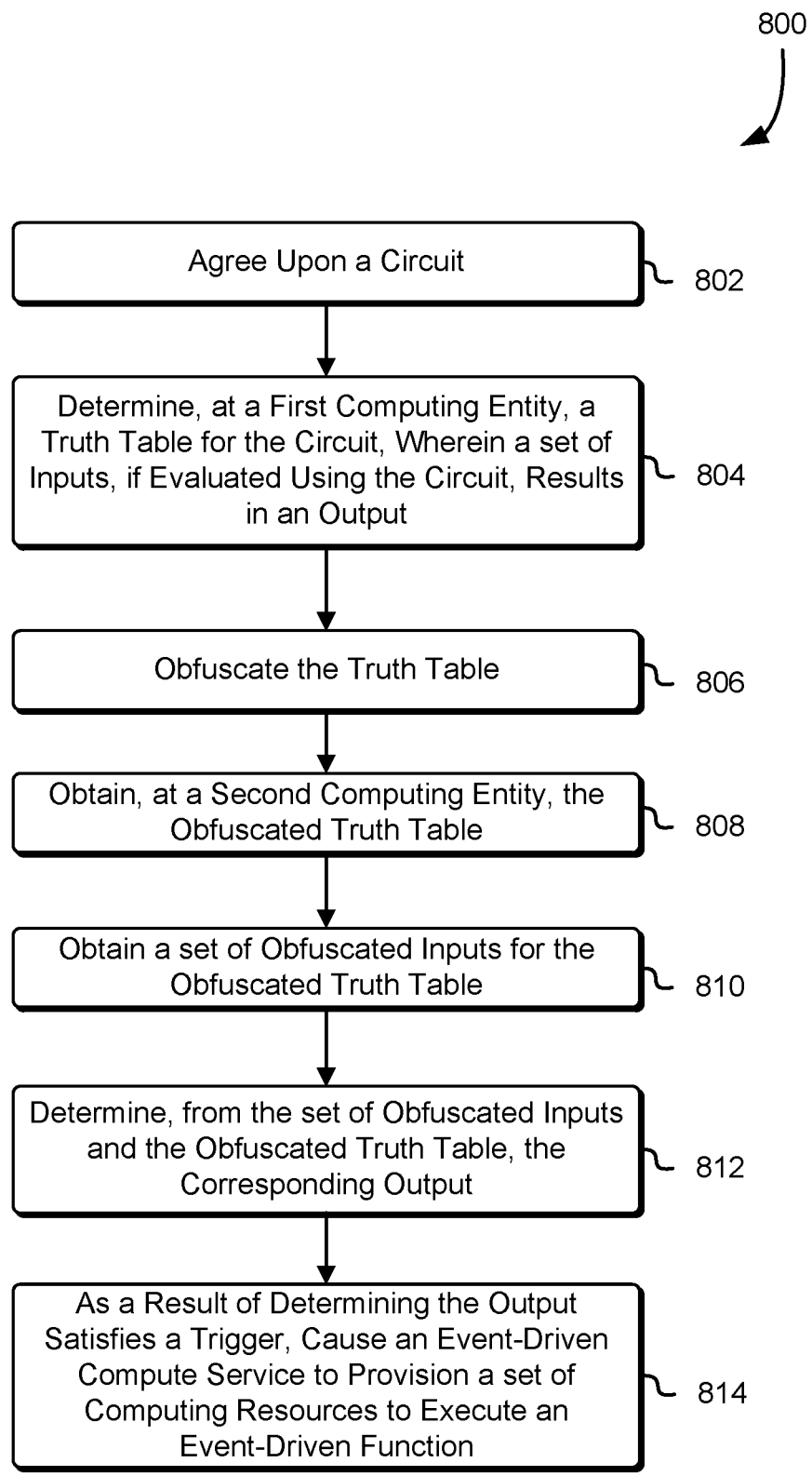
FIG. 8 shows an illustrative example of a process for performing at least part of a multi-party computation according to a cryptographic protocol that preserves the privacy of a data stream utilized to perform data processing and data analytics, in accordance with an embodiment.

FIG. 8 shows an illustrative example of a process 800 for performing at least part of a multi-party computation according to a cryptographic protocol that preserves the privacy of a data stream utilized to perform data processing and data analytics, in accordance with an embodiment. The process 800 may be implemented at least in part by one or more services of a computing resource service provider such as a data privacy service, a data analytics service, an event-driven compute service, and more. In an embodiment, the entire process is executed by computing resources of a computing resource service provider, wherein a portion of the computing resources are controlled and/or executed on behalf of a first computing entity and a different portion of the computing resources are controlled and/or executed on behalf of a second computing entity.

In an embodiment, a first computing entity and a second computing entity agree 802 upon a circuit. In an embodiment, computing entities that implement a garbler module and an evaluation module mutually agree upon the circuit using any suitable protocol, such as by using techniques described in accordance with FIG. 6. The circuit may comprise a set of connected logical gates that generate an output whose value is controlled by a set of input wires to the set of logical gates. The set of input wires may be referred to as a set of inputs.

A first computing entity (e.g., a garbler module implemented by a data privacy service of the computing resource service provider) may determine 804 a truth table for the circuit, wherein a set of inputs, if evaluated using the circuit, result in an output. A set of inputs $\{X, Y\}$ to the circuit may generate a corresponding set of outputs $\{Z\}$. The truth table may be generated by creating a list of all combinations of possible inputs (e.g., for binary inputs A, B, and C, the truth table may have a total of $2^3=8$ rows that correspond to the combinations of possible input values) and, for each combination of inputs, evaluating the circuit to determine the respective outputs. Each row of the truth table may correspond to a set of inputs and an output, wherein the set of inputs, if evaluated using the circuit, results in the output being generated as the result of the circuit from the particular values supplied by the set of inputs.

The first computing entity may obfuscate 806 the truth table by, for example, encrypting each row of the truth table using different cryptographic material and then re-ordering the rows of the truth table according a random or pseudo-random process, thereby generating an obfuscated truth table. In an embodiment, the first computing entity provides the obfuscated truth table to a second computing entity. Various techniques may be utilized to obfuscate the truth table, such as techniques described in connection with FIGS. 1-4.

In an embodiment, the second computing entity (e.g., an evaluation module implemented by a data analytics service of the computing resource service provider) receives or otherwise obtains 808 the obfuscated truth table. The obfuscated truth table may be parsed and obtained from one or more data packets or messages (e.g., including intermediate steps to decompress and/or re-construct the obfuscated truth table from constituent parts). In an embodiment, the system receives a network location such as a universal resource identifier (URI) that refers to a network location where the obfuscated truth table can be accessed—access to the network location, in some embodiments, is contingent upon the system providing a set of credentials (e.g., user permissions, a security token) which can be authenticated and/or authorized, such as by an access management service. Techniques described in connection with FIG. 5 may be utilized. Security permissions may be such that the second computing entity lacks access to input data that is controlled, owned, or otherwise accessible to the first computing entity. In an embodiment, the second computing entity receives or otherwise obtains 810 a set of obfuscated inputs that are based on a set of inputs. The input data may be controlled by one or more computing entities separate from the second computing entity (e.g., logically separated, such as by a trust boundary) such that the second computing entity lacks access to at least a portion of the set of inputs. For example, computation of the circuit may require N inputs, and the second computing entity lacks access to N−1 of the inputs.

Upon receiving the obfuscated circuit inputs, the second computing entity is able to identify a row of the obfuscated truth table that corresponds to the obfuscated inputs and, furthermore, is able to use the first and second obfuscated circuit input to determine 812 the output or result of the circuit evaluated using the circuit input data without revealing the values of the circuit inputs in other words, the second computing entity is able to determine the result of evaluating the circuit without necessarily having access to all inputs to the circuit (e.g., the second computing entity lacks information sufficient to determine at least some of the (un-obfuscated) circuit input data). In an embodiment, the rows of the obfuscated truth table are encrypted and each row of the obfuscated truth table (or a portion thereof, such as only the output for the respective row) is decryptable based at least in part on having access to the respective obfuscated circuit inputs corresponding to the row.

As a result of evaluating an obfuscated circuit (e.g., by evaluating an obfuscated truth table using a set of obfuscated circuit inputs to determine an output) the second computing entity may generate an alarm, alert, notification, message, or any other suitable trigger mechanism to an event-driven compute service, thereby causing 814 the event-driven compute service to provision a set of computing resources to execute an event-driven function. The event-driven compute service may be any suitable computing entity, such as an on-demand compute service of a computing resource service provider that provisions, loads, and executes code based on a trigger. The event-driven compute service may be implemented according to the disclosures presented in FIG. 4. For example, an alert may be sent based on the circuit determining set membership in common between two or more different sets of data that are controlled by different computing entities which lack access to (e.g., are unable to access plaintext or readable versions of) the sets of data of other computing entities.

As used herein, the terms "private key" and "public key" may be used to refer, respectively, to private and public keys used as part of asymmetric cryptography ("public key cryptography"). Asymmetric cryptography refers to a class of cryptographic protocols wherein the private key and public key may be mathematically linked. In public key cryptography, there is no requirement that parties exchange a shared secret. Rather, a public key may be published and may be generally available (even to untrusted parties), whereas the private key should not be revealed to untrusted parties. The key pair (of the corresponding private key and public key) may be used to perform cryptographic operations. For example, a public key may be used to encrypt a plaintext message, resulting in a ciphertext, and the corresponding private key may be used to decrypt the ciphertext, resulting in the original plaintext message. As a second example, a private key may be used to generate a digital signature authenticating a message, and the corresponding public key may be used to verify that the digital signature is correct and thus, that the message is authentic. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted.

Figure 9:
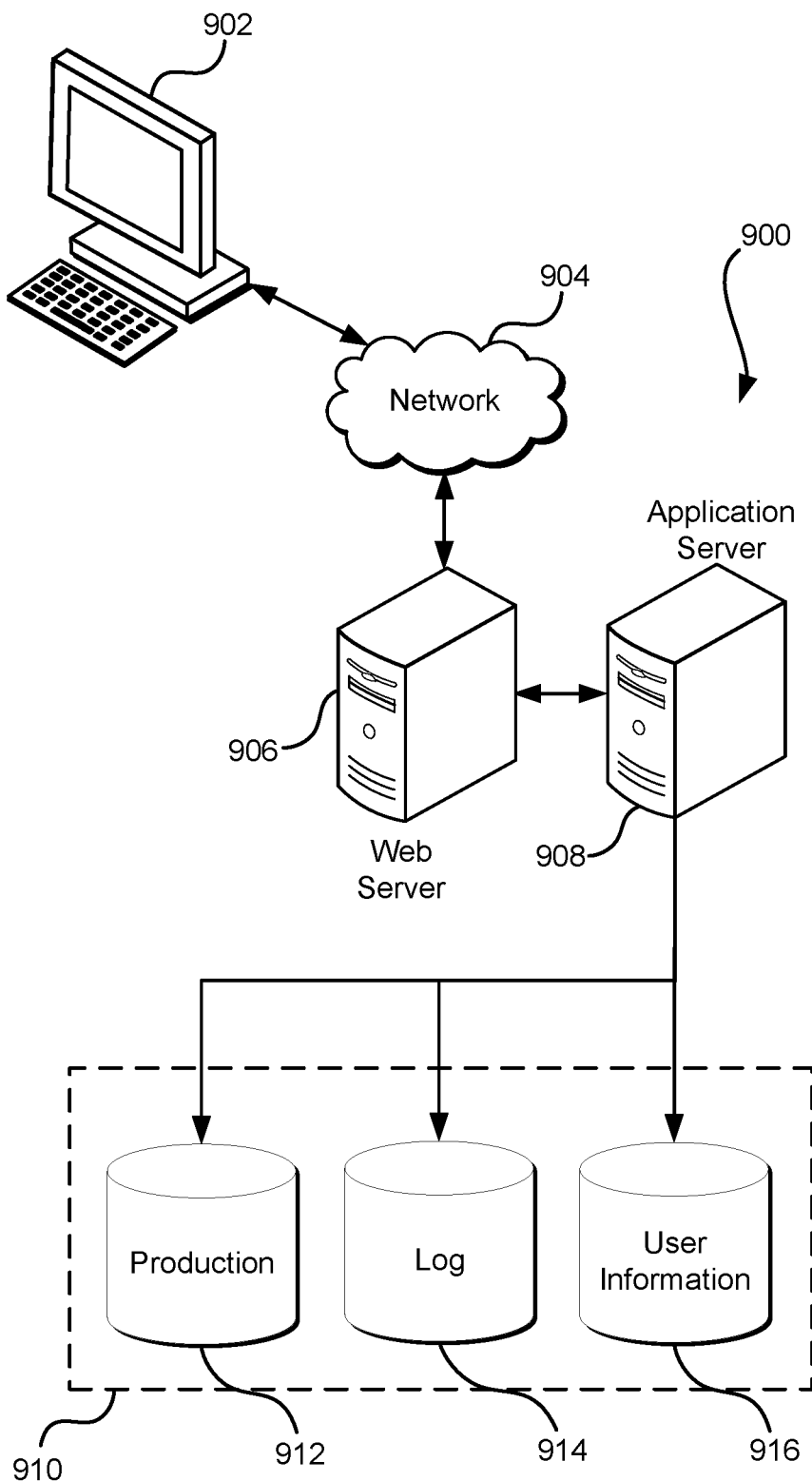
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions. In some cases, a system comprising one or more processors and memory that stores computer-executable instructions (e.g., software application) refers to a system of two or more computing devices wherein at least some of the computing devices individually include a processor and memory that can be used to store the computer-executable instructions or a portion thereof. For example, copies of the computer-executable instructions may be loaded on each of the two or more computing devices. In an embodiment, portions of the computer-executable instructions are loaded across the two or more computing devices so that the memory systems of the computing devices collectively store the computer-executable instructions (e.g., software application).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
at a first computing entity:
determining a truth table for a circuit, the truth table comprising a plurality of rows, a row of the plurality comprising a set of inputs that, as a result of being evaluated using the circuit, results in an output; and obfuscating the truth table to generate an obfuscated truth table by at least:
   obfuscating the set of inputs, thereby generating a set of obfuscated inputs; and
   re-ordering the rows of the obfuscated truth table by at least changing one or more positions of one or more rows of the obfuscated truth table;
at a second computing entity:
   obtaining the obfuscated truth table;
   obtaining, from the first computing entity, a first obfuscated input of the set of obfuscated inputs, wherein the first obfuscated input is derived from a first input accessible to the first computing entity;
   obtaining, from the first computing entity, a second obfuscated input of the set of obfuscated inputs, wherein the second obfuscated input is derived from a second input accessible to the second computing entity; and
   determining, from the set of obfuscated inputs, the output; and
   as a result of the output satisfying a trigger, causing an event-driven compute service to provision a set of computing resources to execute an event-driven function, wherein;
      the event-driven function is selected from a plurality of event-driven functions based on the circuit, and
      satisfying the trigger comprises determining that the output indicates a commonality between the first obfuscated input and the second obfuscated input of the set of obfuscated inputs.

2. The computer-implemented method of claim 1, wherein the second computing entity lacks sufficient cryptographic material to de-obfuscate the obfuscated truth table.

3. The computer-implemented method of claim 1, wherein at least one of the first input and the second input is data collected from a data stream.

4. The computer-implemented method of claim 1, wherein re-ordering the rows of the obfuscated truth table comprises re-ordering the rows of the obfuscated truth table according to a random or pseudo-random process.

5. A system, comprising:
one or more processors; and
memory that stores computer-executable instructions that, as a result of being executed by the one or more processors, cause the system to:
   obtain an obfuscated function, wherein the obfuscated function and a set of obfuscated inputs are usable to determine a set of outputs, further wherein:
   the obfuscated function is based on a function that comprises:
      a set of inputs that can be evaluated to determine the set of outputs, and
      a test resulting in a Boolean output that indicates whether there is an intersection between a first input of the set of inputs and a second input of the set of inputs, and
      the obfuscated function randomizes an order of one or more locations of one or more outputs of the set of outputs;
   determine the set of outputs based on the obfuscated function and the set of obfuscated inputs; and
   as a result of the test indicating that the set of outputs satisfies a trigger, cause an event-driven compute service to provision a set of computing resources to execute an event-driven function, wherein the event-driven function is selected from a plurality of event-driven functions based on the function.

6. The system of claim 5, wherein the system lacks a security permission that provides access to the set of inputs.

7. The system of claim 5, wherein the memory further stores the computer-executable instructions that, as a result of being executed by the one or more processors, cause the system to:
   obtain a first obfuscated input of the set of obfuscated inputs from a first computing entity; and
   obtain a second obfuscated input of the set of obfuscated inputs from a second computing entity.

8. The system of claim 5, wherein the instructions to obtain the obfuscated function include instructions to accept the obfuscated function from a semi-honest computing entity.

9. The system of claim 5, wherein the memory further stores the computer-executable instructions that, as a result of being executed by the one or more processors, cause the system to obtain, according to an oblivious transfer protocol, a first obfuscated input of the set of obfuscated inputs from another computer system, wherein the first obfuscated input is based on a first input that the system has access to.

10. The system of claim 9, wherein the oblivious transfer protocol is a 1-2 oblivious transfer protocol.

11. The system of claim 5, wherein the set of outputs is a binary value.

12. The system of claim 5, wherein:
the event-driven function is executable code provided to the event-driven compute service by the system; and
the instructions to cause the event-driven compute service to provision the set of computing resources to execute the event-driven function include instructions that cause the event-driven compute service to:
   determine a computing environment for executing the event-driven function;
   provision the set of computing resources according to the determined computing environment; and
   load the executable code to the set of computing resources.

13. A non-transitory computer-readable storage medium comprising executable instructions that, as a result of being executed by one or more processors of a computer system, cause the computer system to:
   obtain a function, wherein a set of inputs to the function correspond to a set of outputs;
   obfuscate the function, thereby generating an obfuscated function, wherein the obfuscated function and a set of obfuscated inputs are usable to determine the set of outputs, wherein:
      the obfuscated function randomizes an order of one or more positions of one or more inputs of the set of inputs corresponding to the set of outputs;
      the set of obfuscated inputs are based on the set of inputs;
      evaluation of the obfuscated function produces an output that indicates whether there is an overlap between members of the set of obfuscated inputs; and
      an event-driven compute service, in response to detecting a trigger based on the output of the obfuscated function, is configured to cause execution of an event-driven function that utilizes the set of outputs; and
   provide the obfuscated function to another computer system.

14. The non-transitory computer-readable storage medium of claim 13, wherein the function is a Boolean circuit.

15. The non-transitory computer-readable storage medium of claim 14, wherein the Boolean circuit comprises a set of XOR gates.

16. The non-transitory computer-readable storage medium of claim 13, wherein the instructions, as a result of execution by the one or more processors, further cause the computer system to deny the other computer system access to the one or more inputs of the set of inputs absent the output indicating the overlap between the members.

17. The non-transitory computer-readable storage medium of claim 13, wherein the instructions, as a result of execution by the one or more processors, further cause the computer system to:
- obtain an input of the set of inputs;
- obfuscate the input, thereby generating an obfuscated input of the set of obfuscated inputs; and
- provide the obfuscated input to the other computer system.

18. The non-transitory computer-readable storage medium of claim 13, wherein the instructions to obfuscate the function include instructions that, as a result of execution by the one or more processors, cause the computer system to generate a garbled truth table by:
- determining a truth table for the function, a row of the truth table comprising one or more input values and one or more output values, the one or more output values determined based on the function and the one or more input values;
- re-ordering the rows of the truth table, thereby resulting in a re-ordered truth table; and
- encrypting the one or more output values.

19. The non-transitory computer-readable storage medium of claim 18, wherein the instructions to encrypt the one or more output values include instructions that, as a result of execution by the one or more processors, cause the computer system to encrypt the one or more output values using a cryptographic key determined based on the one or more input values.

20. The non-transitory computer-readable storage medium of claim 13, wherein the computer system obtains, from the other computer system and as a result of execution of the event-driven compute service, one or more of the set of inputs.

* * * * *